(12) United States Patent
Melcher et al.

(10) Patent No.: US 8,760,749 B2
(45) Date of Patent: Jun. 24, 2014

(54) ELECTROCHROMIC LAYER STRUCTURE AND METHOD FOR THE PRODUCTION THEREOF

(75) Inventors: Martin Melcher, Herzogenrath (DE); Philippe Letocart, Raeren (BE); Emily Bressand, Aachen (DE); Jean-Christophe Giron, Eupen (BE)

(73) Assignee: Saint-Gobain Glass France (FR)

( * ) Notice: Subject to any disclaimer, the term of this patent is extended or adjusted under 35 U.S.C. 154(b) by 0 days.

(21) Appl. No.: 13/377,802

(22) PCT Filed: Jun. 8, 2010

(86) PCT No.: PCT/EP2010/057981
§ 371 (c)(1),
(2), (4) Date: Jan. 31, 2012

(87) PCT Pub. No.: WO2011/003686
PCT Pub. Date: Jan. 13, 2011

(65) Prior Publication Data
US 2012/0134004 A1    May 31, 2012

(30) Foreign Application Priority Data

Jul. 10, 2009 (DE) .......................... 10 2009 026 148

(51) Int. Cl.
*G02F 1/153* (2006.01)
(52) U.S. Cl.
CPC ................................... *G02F 1/1533* (2013.01)
USPC .......................................... 359/275; 359/265
(58) Field of Classification Search
USPC ................. 359/265–267, 271, 273–275, 591; 296/77.1, 84.1, 96.19–96.22, 296/97.1–97.13; 52/204.5, 204.51, 204.52, 52/204.53, 205–217
See application file for complete search history.

(56) References Cited

U.S. PATENT DOCUMENTS

| | | |
|---|---|---|
| 4,844,591 A | 7/1989 | Arribart et al. |
| 5,229,040 A | 7/1993 | Desbat et al. |
| 5,293,546 A | 3/1994 | Tadros et al. |
| 6,496,295 B1 | 12/2002 | Wittewer et al. |
| 6,747,779 B1 | 6/2004 | Morin et al. |
| 6,791,737 B2 | 9/2004 | Giron et al. |
| 7,193,763 B2 | 3/2007 | Beteille et al. |
| 2006/0163744 A1 | 7/2006 | Vanheusden et al. |

(Continued)

FOREIGN PATENT DOCUMENTS

| | | |
|---|---|---|
| EP | 0253713 | 1/1988 |
| EP | 0381360 | 8/1990 |

(Continued)

OTHER PUBLICATIONS

PCT International Search Report issued for PCT/EP2010/057981 filed Jun. 8, 2010 in the name of Saint-Gobain Glass France.

(Continued)

*Primary Examiner* — Scott J Sugarman
*Assistant Examiner* — Gary O'Neill
(74) *Attorney, Agent, or Firm* — Steinfl & Bruno LLP

(57) ABSTRACT

An electrochromic layer structure with at least one active layer and at least two electrodes is described. At least one of the electrodes has an electrically conductive network of conductor tracks and the conductor tracks contain nanoparticles. An electrochromic device, a method for production of an electrochromic layer structure and use of an electrochromic layer structure and an electrochromic device are also described.

25 Claims, 10 Drawing Sheets

(56) References Cited

U.S. PATENT DOCUMENTS

Figure 1:
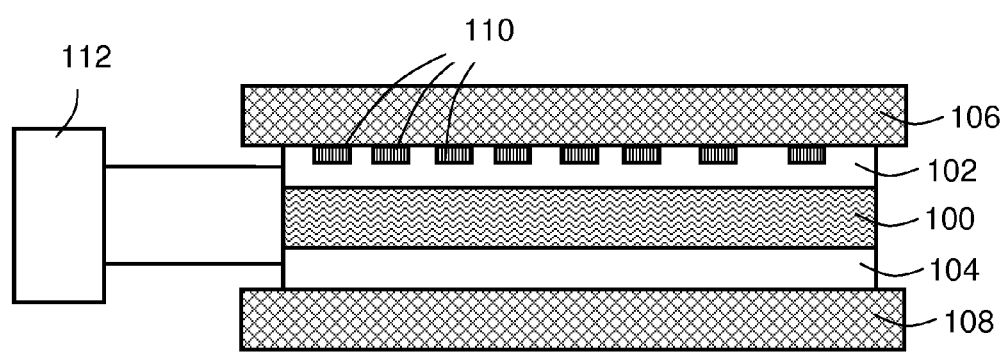

| | | | |
|---|---|---|---|
| 2006/0191215 A1* | 8/2006 | Stark | 52/204.6 |
| 2007/0153353 A1* | 7/2007 | Gruner | 359/245 |
| 2010/0027098 A1 | 2/2010 | Piroux et al. | |
| 2010/0028633 A1 | 2/2010 | O'Rourke et al. | |
| 2011/0273085 A1 | 11/2011 | Garbar et al. | |

FOREIGN PATENT DOCUMENTS

| | | |
|---|---|---|
| EP | 0382623 | 8/1990 |
| EP | 0867752 | 9/1998 |
| JP | 60011884 | 1/1985 |
| JP | 2006312673 | 11/2006 |
| JP | 2008235035 | 10/2008 |
| WO | 2008/084168 | 7/2008 |

OTHER PUBLICATIONS

PCT Written Opinion mailed on Sep. 14, 2010 for PCT Application No. PCT/EP2010/057981 filed on Jun. 8, 2010 in the name of Saint-Gobain Glass France.

* cited by examiner

ELECTROCHROMIC LAYER STRUCTURE AND METHOD FOR THE PRODUCTION THEREOF

CROSS REFERENCE TO RELATED APPLICATIONS

The present application is the US national stage of International Application PCT/EP2010/057981 filed on Jun. 8, 2010, which in turn, claims priority to German Patent Application No. 10 2009 026 148.6 filed on Jul. 10, 2009.

The invention relates to an electrochromic layer structure, an electrochromic device, a method for production of an electrochromic layer structure as well as a use of an electrochromic layer structure and an electrochromic device.

Windows are an important component in buildings. Whereas, in the past, windowpanes served merely the purpose of a clear view toward the outside, nowadays substantially higher demands are placed on glazings. For one thing, glazed areas should serve for ideal thermal insulation of interior spaces; however, for another, they should also ensure that, because of the glazing, when the sun shines in, interior spaces are heated only to a desirable level. A possible control of the admission of light through glazed areas can be regulated, for example, by movable blinds. Another possibility is offered by glazings that change their optical properties such as transparency and reflectivity at the touch of a button or independently. Such switchable glazings offer architects greater design flexibility for glazed areas without requiring movable parts in front of or within a fagade.

Glazings that change their optical properties at the touch of a button or independently also include electrochromic glazings. Electrochromic glazings operate on the principle that the optical properties of electrochromic layers change by means of absorption and discharge of charge carriers. When a current flows, an exchange of charge carriers occurs and the electrochromic layer changes its permeability to sunlight.

Typically, electrochromic glazings include an active layer that is surrounded by transparent electrodes. Through application of an external voltage, charge carriers are transported into the active layer causing the active layer to change its transparency to visible light. If a voltage of the opposite polarity is then applied, the charge carrier migration is reversed such that the original transparency is restored. The active layer includes an ion-conducting electrolyte and electrochromic material. The electrochromic material changes its transmission properties for electromagnetic radiation by changing its oxidation state. The electrolyte can consist of an inorganic material as is disclosed in EP 0 867 752 and EP 0 831 360. However, the electrolyte can also consist of an organic material, which is described in EP 0 253 713 and EP 0 382 623. The active layer can be present completely or partially in a solid or liquid state. An electrolyte with solid and liquid components is disclosed, for example, in WO 2008/084168. If the active layer and the electrodes include polymer material, this combination is referred to as an all-polymeric electrochromic system. Such systems are, for example, known from U.S. Pat. No. 6,747,779 B1.

It is problematic that a complete transparency change of the active layer can require as much as several minutes. This represents no problem with simple building glazings; however, it is unacceptable for use, for example, in motor vehicles, aircraft, and rail vehicles. Here, it must be guaranteed that an immediate increase in transparency of the electrochromic glazing takes place at the time of a spontaneous external change from bright to dark, as occurs, for example, when driving into a tunnel. The same is true for emergency situations in which it is required that maximum transparency of electrochromic glazings, e.g., in motor vehicles, be guaranteed within split seconds.

One of the reasons for a relatively slow tint transition process of the active layer in electrochromic glazings is the low electrical conductivity of the electrodes that limits a possible flow of current for the change in transparency of the active layer.

To address this problem, U.S. Pat. No. 6,747,779 B1 discloses additionally providing one of the electrodes with an electrically conductive network. This network is produced with metal wires or with the use of a paste. The paste contains silver particles and gas frits.

However, the use of the conductive paste has the disadvantage that the methods for stabilization of the paste require high process temperatures. The high temperatures are required, in particular, to melt the glass frits and/or to sinter the silver particles. Through the method, the active layer, which is sensitive to high temperatures, is attacked.

Alternative low-temperature methods for stabilization and curing of pastes are, on the other hand, very time-consuming.

The formation of an electrically conductive network with metal wires is material-intensive since the application of finished metal wires requires a greater amount of metal material than is necessary for the required electrical conductivity of the network.

With the formation of electrical networks using metal wires, it must also be noted that the selection of possible network geometries is reduced.

The object of the invention is to provide an improved electrochromic layer structure, an improved electrochromic device, and an improved method for production of an electrochromic layer structure.

In addition, the object of the invention is to find a new use of an improved electrochromic layer structure and an improved electrochromic device.

The objects of the invention are accomplished in each case through the characteristics of the independent claims. Preferred embodiments of the invention are indicated in the dependent claims.

According to the invention, an electrochromic layer structure with at least one active layer is provided, wherein the layer structure has at least two electrodes, and at least one of the electrodes has an electrically conductive network of conductor tracks, and the conductor tracks contain nanoparticles.

These nanoparticles can have a diameter of 1 nm to 500 nm. However, the nanoparticles have a diameter of 5 nm to 100 nm, and, particularly preferably, the nanoparticles have a diameter of 10 nm to 30 nm.

The nanoparticles contain metals and/or carbon compounds. Preferably, the nanoparticles contain silver, copper, aluminum, carbon black (conductive carbon black), and/or carbon nanotubes as well as mixtures thereof.

The use of nanoparticles for the formation of the conductor tracks has the advantage that with this particle size, the process temperature required for the printing process for stabilization of the conductor tracks or sintering is reduced. Thus it is possible, with a diameter distribution in the range below 100 nm, to reduce the process temperature to as low as 70° C. In this temperature range, the active layer is not temperature sensitive since the active layer is designed to withstand temperatures above 70° C. in a laminate of panes with maximum incident sunshine.

For protection of the active layer and of the electrodes against external influences, such as moisture or mechanical stress, the electrochromic layer structure has transparent protective layers and/or protective panes.

Preferably, the protective layer includes silicon nitrides, oxides such as silicon oxide, silicon nitride or zinc oxide, indium oxide, tin oxide, and/or mixtures thereof, with a preferred thickness of 5 nm to 500 nm.

According to a preferred embodiment of the invention, the protective pane of the layer structure can also include germanium, silicon, silicate glasses such as soda lime glass, borosilicate glass, sapphire, or polymers such as polystyrene, polyamide, polyester, polyvinyl chloride, polycarbonate, ethylene vinyl acetate, plasticized polyvinyl butyral, polyimide, polyethylene terephthalate, polyethylene, polypropylene, polyurethane, ionomers, and/or polymethyl methacrylate, copolymers and/or combinations thereof. The protective panes have a preferred thickness of 0.01 mm to 25 mm. The protective panes can be rigid panes or mechanically flexible and have the nature of film. Protective panes have the advantage that they encapsulate the active layer and the electrode material against external environmental influences and, in particular, protect against mechanical effects.

The protection of the active layer and/or of the electrodes can further be improved by an additional protective layer lying between the active layer and the protective pane containing argon, xenon, nitrogen, air, and/or mixtures with a pressure of 1000 Pa to 200,000 Pa. A particularly well-suited construction of a gaseous protective layer is known with multipane insulating glazings.

Preferably, the network of conductor tracks formed by nanoparticles is developed between the active layer and the protective layer and/or between the active layer and the protective pane.

This enables the use of various production methods, wherein, preferably, the conductor track network is applied directly on the active layer, the conductor track network is applied on the electrode, or the conductor track network is applied on an optically transparent and conductive protective layer. This opens a broad field of alternative production methods for electrochromic layer structures that can be flexibly adapted to physical conditions and also to workflow-related conditions. Thus, it is to be anticipated that with direct application of the electrically conductive network on the active layer, a charge carrier exchange in the active layer is greatly increased such that such a design is suitable, in particular, for electrochromic layer structures that are to be switched extremely quickly. It is also conceivable to produce the active layer together with the electrodes in a workflow and not to apply the conductor track network until after that. In this case, there is the possibility of the flexible choice of the subsequent application of the conductor track network on one of the electrodes or on a protective layer that is optically transparent in the range of visible light, whereby, in this case, the network of conductor tracks is located between the electrode and the protective layer.

It is also possible to design the electrochromic layer structure with at least two active layers lying one above the other and with intermediate electrodes lying between them. This embodiment has the advantage that the active layers can be switched independently of each other.

According to another embodiment of the invention, the electrically conductive network is optically transparent when viewed macroscopically. "Optically transparent when viewed macroscopically" means that the electrically conductive networks of conductor tracks can, in themselves, be microscopically opaque; but because of their small share of the area relative to the total area, they appear optically transparent when viewed macroscopically. Optical transparency includes the technically usable electromagnetic radiation spectrum, preferably, the ultraviolet, visible, and infrared radiation spectrum. Thus, the electrochromic layer structure can be used even in glazings that require the best possible visibility, without restriction yet capable of being darkened, for permanent visibility while operating means of transportation such as aircraft, automobiles, and trains.

According to one embodiment of the invention, the conductor tracks have a width between 1 µm and 10 mm, with the conductor tracks having a distance of 1 µm to 50 mm between them. Preferably, the conductor tracks are, however, dimensioned with regard to their width and spacing such that, with the minimum possible material outlay for the formation of the conductor tracks, adequately high electrical conductivity for charge carrier transport and adequately high optical transparency can be guaranteed.

According to one embodiment of the invention, the electrically conductive network has conductor tracks with different layer thicknesses. Thus, the conductor tracks of the network have different electrical conductivities. An advantage of this embodiment consists, in particular, in that because of the different electrical conductivity, different regions of the active layer can be actuated differently.

According to another embodiment of the invention, the nanoparticles are carbon nanoparticles, with the carbon nanoparticles being carbon nanotubes and/or carbon black. Carbon black consists of small particles with a typical size range between 10 nm and 100 nm. With the use of carbon black, so-called conductive carbon black, which has particularly good electrical conductivity, can be used as nanoparticles for conductor tracks.

The use of carbon nanotubes has the advantage that they have high electrical conductivity because of their high aspect ratio, diameter to length. Thus, an extremely small quantity of carbon nanotubes suffices to, nevertheless, guarantee high electrical conductivity of the conductor tracks formed from them.

Alternatively, it is also possible for the nanoparticles in the form of a composite material with a plastic or silicate glass to form the conductor tracks. Such plastics can be polyacrylates, epoxides, and/or polyaniline as well as copolymers and/or combinations thereof. Through the additional use of plastics as carriers of the conductor tracks, their mechanical stability is increased for one thing. For another, through the use of conductive plastics, such as polyaniline, the electrical conductivity of the conductor tracks formed by nanoparticles is further increased. Thirdly, the use of plastics in the conductor tracks, which encapsulate the nanoparticles relative to the active layer, for example, serves to prevent direct spatial contact between the active layer and the nanoparticles. Thus, ion-conductive materials, which would enter into a chemical or electrochemical reaction with the nanoparticles without encapsulation of the nanoparticles can also be used as the active layer. Thus, the flexibility with regard to the selection of the ion-conductive materials used in the active layer is increased.

In another aspect, the invention relates to an electrochromic device with the layer structure according to the invention in electrical contact with a control unit.

In a preferred embodiment, the electrochromic device includes at least two protective panes. Such an electrochromic device can be an electrochromic glazing.

According to another embodiment of the invention, at least one protective layer of the electrochromic layer structure is formed by an external protective pane or an external protective pane is formed by a protective layer of the electrochromic layer structure. It is possible, through appropriate selection of the optically transparent protective layer material in the use of the electrochromic device as window glazing, to do without an additional glass pane. Plastic materials can be used that are, for one thing, optically transparent in the range of visible light, and, for another, have high mechanical hardness, but without having the weight of conventional window glazings. This yields the possibility of the production of electrochromic glazings with substantially lower weight than is the case with glazings customary in the trade.

The protective pane can be constructed in the electrochromic device as a composite pane made of a plurality of layers and can preferably include a polymer layer as a binding agent. Particularly preferably, the layer structure with an additional protective pane as a laminated glass can form an electrochromic device.

This electrochromic device can be a window pane and, preferably, a laminated glass pane, wherein the surfaces are formed from silicate glass and/or polymers.

In one embodiment of the electrochromic device, it is a double-insulating or multi-insulating glazing, wherein the electrochromic layer structure is located on internal and/or external window panes of the insulating glazing. A gaseous protective volume of the layer structure is advantageous, particularly with the use of the electrochromic layer structure in double-insulating or multi-insulating glazings as an electrochromic device since the insulating glass construction provides a protective volume. In this embodiment, the protective volume also reduces the passage of heat through the glazing and has a thermal insulating effect.

In another aspect, the invention relates to a method for production of an electrochromic layer structure with at least one active layer, wherein the layer structure has two electrodes, and the method comprises the steps of the application of a network of nanoparticles on at least one of the electrodes and the step of the heating of the network of nanoparticles to form an electrically conductive network of conductor tracks.

According to one embodiment of the invention, the application of the networks of nanoparticles occurs, preferably, through a printing method, such as screenprinting, engraving cylinder printing, and, particularly preferably, inkjet printing, aerosol jet printing, pulse jet printing, and/or roller rotation printing methods, such as flexography.

Through the method according to the invention, any geometries can be printed on areas. Contact-free printing is also possible with methods according to the invention. It is also possible to print a conductive network between the active layer and the electrode. Preferred geometries are, for example, lines and curves arranged parallel or antiparallel, lines or curves with cross connections, regular or irregular net-like structures, contiguous areas with regular or irregular recesses, as well as noncontiguous rectangles or ellipsoids.

The selection of the suitable liquid depends on various criteria, such as process temperature for stabilization of the networks, aggregation behavior of the nanoparticles in a liquid as well as, in particular, with the selection of liquid plastics as the liquid, the later use of the hardened plastic as protective conductive encapsulation of the nanoparticles.

According to another embodiment of the invention, the application of the network of nanoparticles takes place through application of a dispersion, wherein the dispersion comprises the nanoparticles and a liquid and the liquid is water and/or an organic solvent and/or a liquid plastic.

The size of the devices according to the invention can vary broadly and is determined by the respective purpose for use in the context of the use according to the invention. Thus, the devices according to the invention can have dimensions on the order of a few centimeters up to several meters. In particular, the devices that are planar or slightly or greatly bent or curved in one or a plurality of spatial directions can have an area on the order of 100 cm$^2$ to 25 m$^2$, preferably, >1 m$^2$ or PLF (3.21 m×6.0 m=19.26 m$^2$), which is the "standard" of the glass industry. The devices according to the invention can also have areas as they customarily have in covers for headlights, windshields, side windows, rear windows, and glass roofs for motor vehicles or large-area panes, in particular as are used in the building sector.

According to another embodiment of the invention, the stabilization or sintering of the network of nanoparticles into conductor tracks is accomplished by thermal conduction and electromagnetic radiation in ovens, but, preferably, through infrared radiation and ultraviolet radiation and, particularly preferably, through laser irradiation and/or microwave irradiation. The use of laser irradiation has the advantage that by targeting a focused laser beam at the desired network structure of nanoparticles exclusively on the desired spatial network structures on which the laser beam strikes the nanoparticles, a process of stabilization of the network and thus, as the case may be, a bonding of the nanoparticles to the electrodes and/or the active layer also occurs. Nanoparticles that which lie outside the desired network structure traveled by the laser beam are not included in the heating process such that no curing and no direct processing occur here. A subsequent washing process thus enables removing nanoparticles that were not struck by the laser beam defining the network. Thus, in a simple manner, a well-defined conductive network of nanoparticles can be created.

Figure 2:
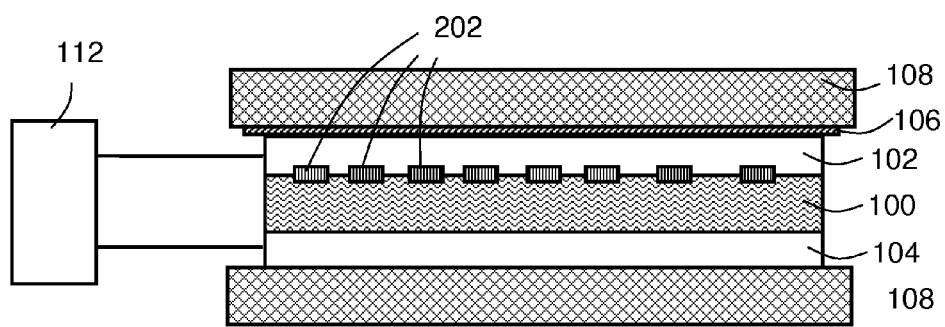
Figure 3:
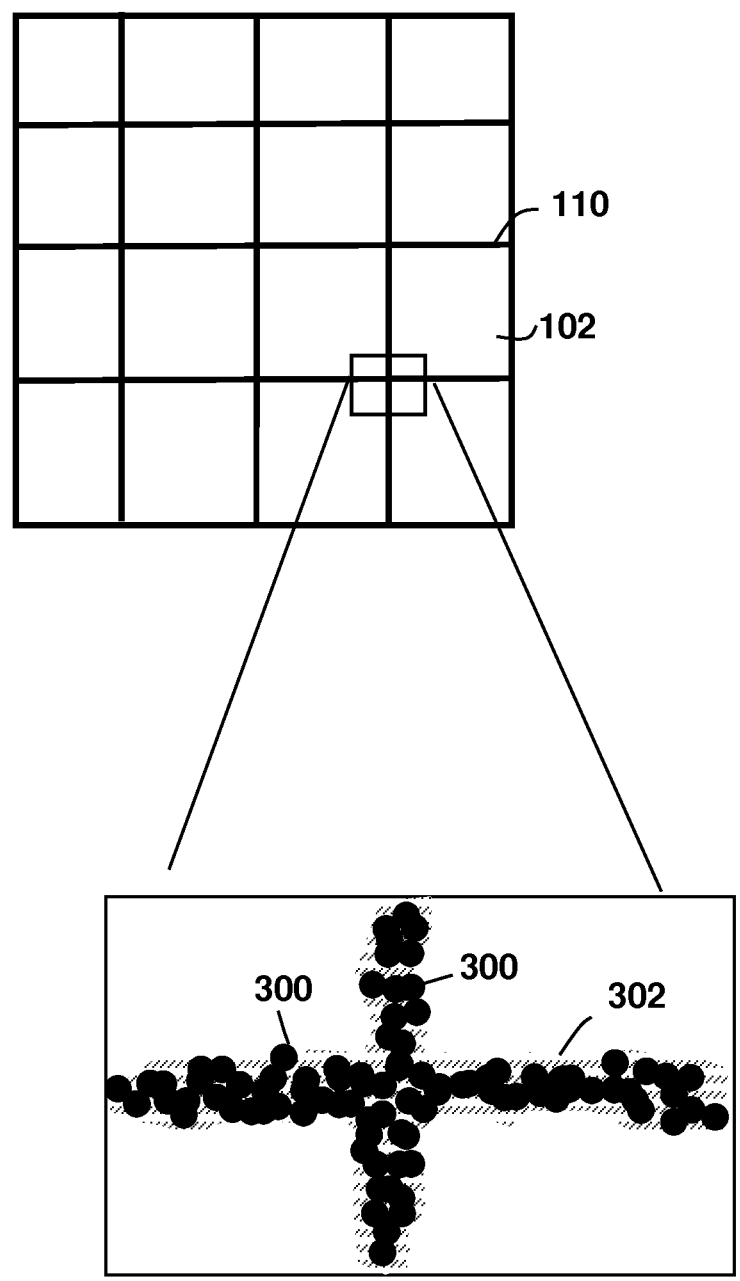
Figure 4:
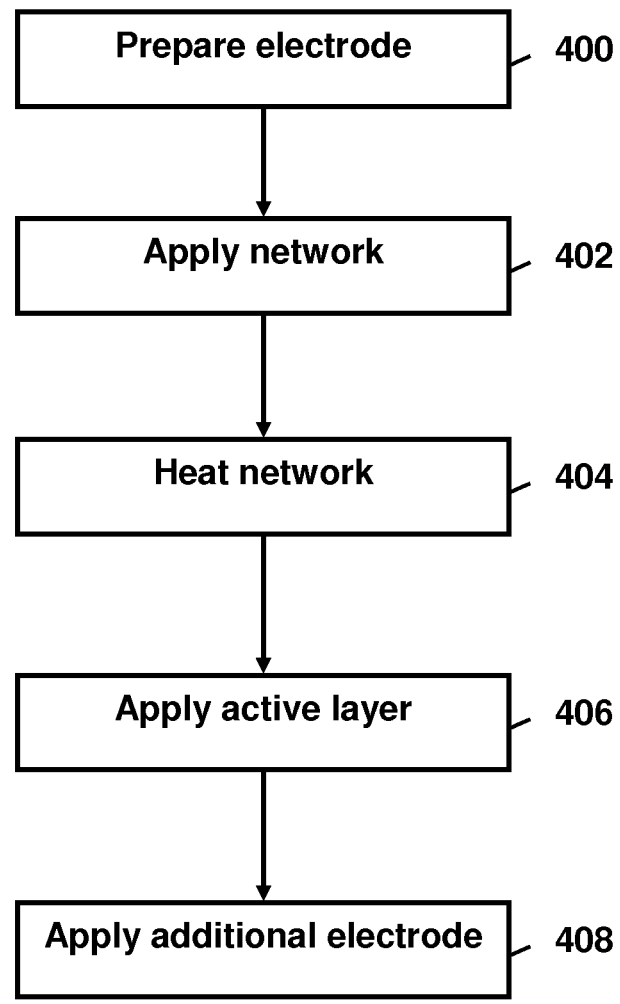
Figure 5:
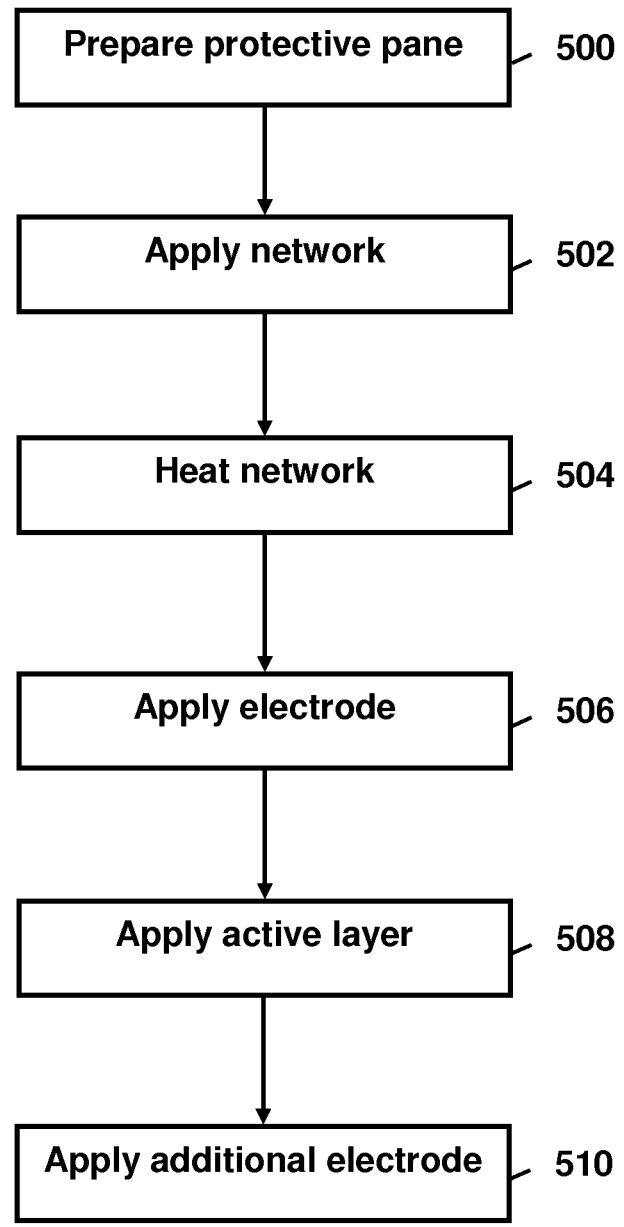
Figure 6:
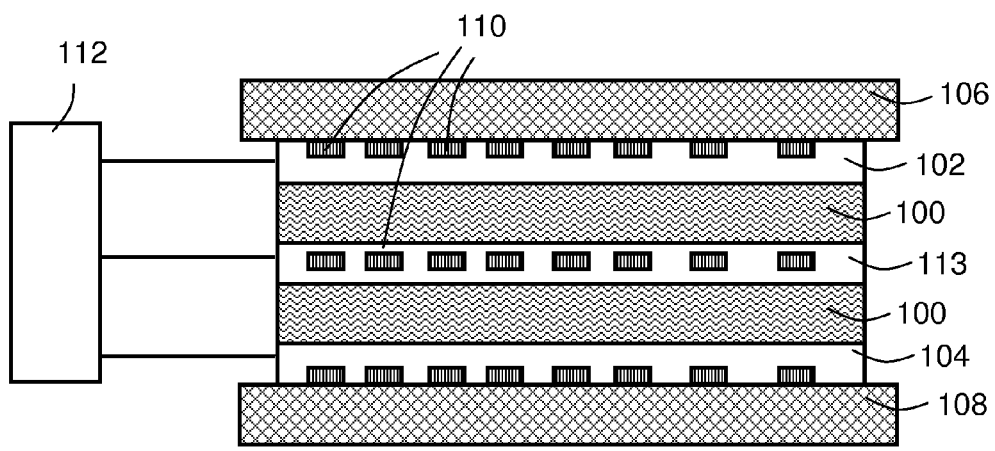
Figure 7:
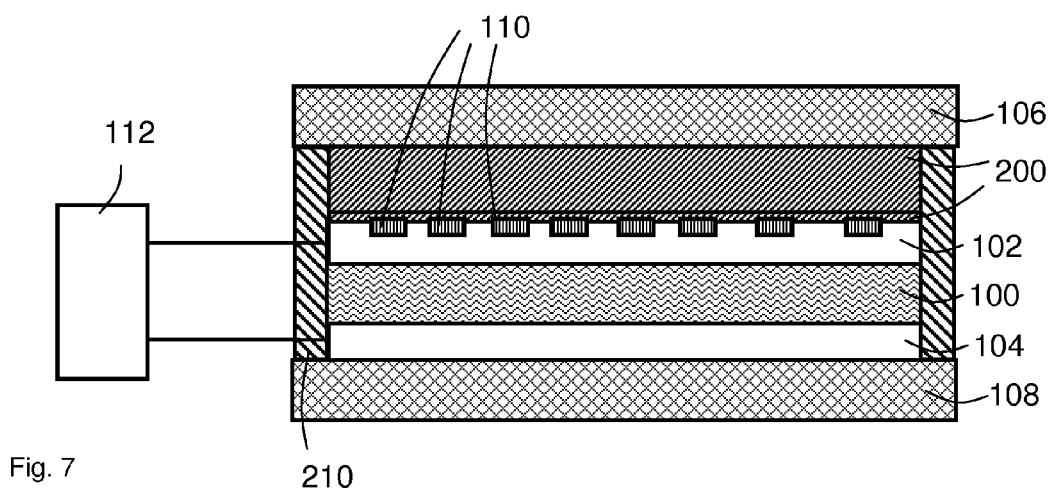
Figure 8:
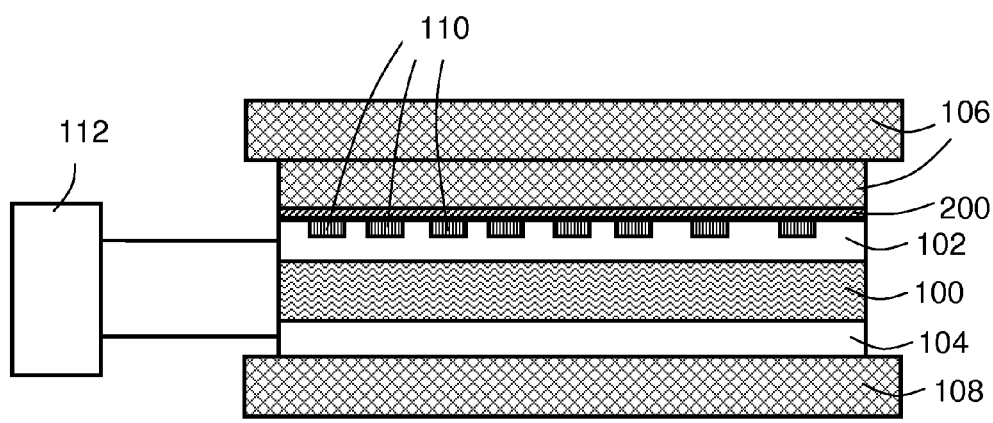
Figure 9:
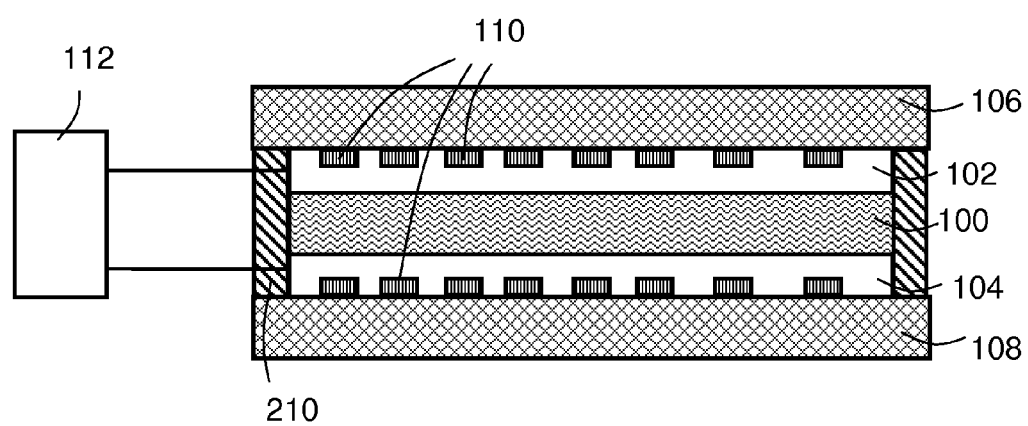
Figure 10:
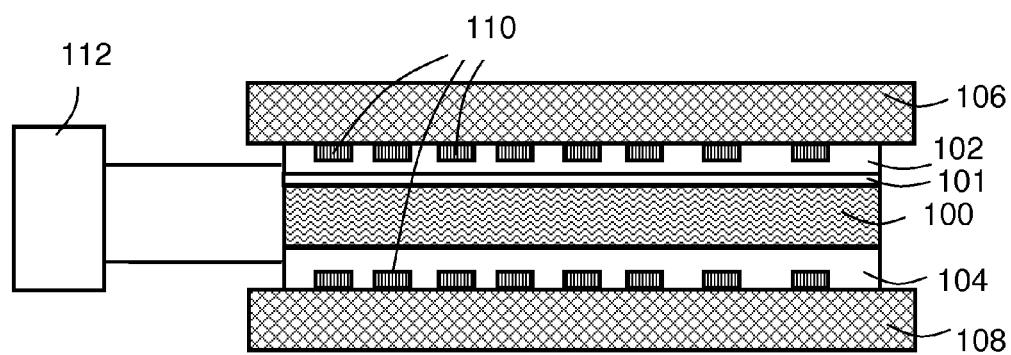

In addition, embodiments of the invention are explained in detail with reference to the drawings. They depict:

FIG. 1 a schematic view of an electrochromic layer structure,

FIG. 2 a schematic view of another electrochromic layer structure with a protective layer, FIG. 3 a schematic view of a network of nanoparticles on an electrochromatic active layer as well as a microscopic enlargement of the conductor track network, FIG. 4 a flow diagram of a method for production of an electrochromic layer structure, FIG. 5 a flow diagram of a method for production of an electrochromic layer structure, FIG. 6 a schematic view of another electrochromic layer structure with two active layers, FIG. 7 a schematic view of an electrochromic layer structure with a gaseous protective layer, FIG. 8 a schematic view of an electrochromic layer structure in a laminated glass, FIG. 9 a schematic view of another exemplary embodiment of an electrochromic layer structure with a liquid electrolyte in the active layer, and FIG. 10 a schematic view of another exemplary embodiment of an exemplary embodiment of an electrochromic layer structure with a multilayer electrode.

In the following, elements similar to each other are labeled with the same reference characters.

FIG. 1 depicts a schematic view of an exemplary embodiment of an electrochromic layer structure. The electrochromic layer structure comprises an electrochromatically active layer 100 that is embedded between two electrodes 102 and 104. In addition, these electrodes 102 and 104 are in each case covered on the side facing away from the active layer by transparent protective panes 106 and 108. The electrochromic layer structure of FIG. 1 can be an electrochromic structure with an inorganic solid electrolyte and the transparent protective panes 106 and 108 can be borosilicate glasses.

The electrochromic control unit 112 serves, as a result of the application of a voltage between the electrodes 102 and 104, as a transparency control of the active layer relative to incident light. The electrode 104 is an anode, and the electrode 102 is a cathode. As a result of the application of a positive voltage to the anode 104 and a negative voltage to the cathode 102, ion transport through the active layer 100, which includes an ion-conductive polymer, occurs. The cathode 102 contains tungsten oxide. The anode 104 contains hydrogen ions. As a result of the application of voltage between the anode and cathode, hydrogen ions migrate through the ion-conductive polymer into the cathode 102 and form color centers there with tungsten oxide that absorb or reflect incident light. When a voltage of the opposite polarity is then applied, this effect is reversed such that decolorization of the cathode 102 occurs.

The ion migration depends greatly on the selection and thickness of the active layer 100, on the one hand, and also on the material selection and the thickness of the cathode 102. The problem emerges here that with overly thin dimensioning of the cathode 102 whose optical transparency is high but the electrical conductivity is so low that an electrochromatic coloration or decoloration process takes considerable time because of the low charge transport. By contrast, if the conductivity of the cathode layer 102 is increased by increasing its thickness, the electrochromatic transparency change process can be accelerated, but at the cost of a reduced maximum transparency and of the increased thickness and, with it, of the permeability to light of the layer 102.

To remedy this problem, the network 110 of conductor tracks in FIG. 1 is introduced between the protective pane 106 and the electrode 102. This network of conductor tracks is formed by nanoparticles (300), with the network of conductor tracks having the result that, for one thing, the layer thickness of the electrode 102 is kept low; and, for another, the electrical conductivity is nevertheless adequate because of the additional conductor tracks of the electrochromic layer structure.

The conductor tracks 110 are, preferably, arranged such that when viewed macroscopically, the network formed by the conductor tracks is optically transparent. This can be realized through an extremely thin dimensioning of the conductor tracks with a width of less than 10 μm and with a large distance between them, preferably, more than 1 mm.

As is discernible from FIG. 1, the electrically conductive network of conductor tracks, which are formed by nanoparticles (300), is located between the transparent protective pane 106 and the electrode 102.

An alternative embodiment thereto is depicted in FIG. 2. Here, an electrically conductive network 202 is located between the active layer 100 and the electrode 102. In addition, FIG. 2 depicts a protective pane 106, which is located between the active layer 100 and the protective pane 108. The protective pane 106 is a plastic layer, which includes polyvinyl butyral (PVB). The protective pane 108 is a borosilicate glass pane. Such a PVB film is typically melted at temperatures of roughly 150° C. onto the electrode 102 such that, after cooling, there is a permanent bond between cathode 102 and the PVB film 106 (PVB protective pane 106), which protects the electrode 102 and the active layer 100 against external environmental influences.

FIG. 3 depicts an electrically conductive network of conductor tracks 110 on an active layer 102. In the example of FIG. 3, the network thus formed forms a regular rectangular arrangement of conductor tracks, which, because of the large distance between the individual conductor tracks, guarantees good visibility through it when viewed macroscopically.

In an enlargement of the electrically conductive network of conductor tracks 110, the nanoparticles 300 depicted in FIG. 3 become visible. The nanoparticles 300 are arranged relative to each other such that they form electrically conductive conductor tracks.

In the enlargement of FIG. 3, a polymer 302 can be seen, in which the nanoparticles 300 are embedded. The polymer 302 is electrically conductive and is filled with nanoparticles 300 up to a specific filling level. Above a specific filling level, the electrical conductivity of the conductor tracks thus formed increases sharply. Below a specific filling level, the electrical conductivity is too low. Far above a specific fill level, the electrical conductivity increases only insignificantly even with further addition of nanoparticles 300. Through appropriate selection of a composite material consisting of nanoparticles 300 and filling material 302, an optimum composite material that has high electrical conductivity, high mechanical stability, and also high chemical inertness can be selected.

FIG. 4 depicts a method for production of an electrochromic layer structure. The method starts with step 400 by preparing an electrode, preferably a cathode. In step 402, a network that includes nanoparticles 300 is applied on the cathode. In step 404, this network is heated in order to obtain, by means of a sintering process, a mechanically stable and electrically conductive network of conductor tracks. Step 406 follows with the application of an electrochromatically active layer, wherein this active layer can be applied either on the network or on the electrode. And finally, the method ends with step 408 through the application of another electrode on the active layer that is applied on the side of the active layer that is opposite the electrode prepared in step 400.

It should be noted that the method for application of the network is suitable both to apply the network on the cathode and on the anode in the form of two separate networks.

An alternative embodiment of a method for production of an electrochromic layer structure is depicted in the flow diagram of FIG. 5. Here, in step 500, a protective pane, for example, a PVB layer is prepared on a silicate glass pane. Instead of the use of a PVB layer, it is also possible to use a glass pane, plastic pane, or the like, which, in the case of the use of the electrochromic layer structure as electrochromic glazing, serves directly as a separating pane against the external environment of the electrochromic glazing.

After the protective pane is prepared in step 500, the network is applied on the protective pane in step 502. The network is again heated in step 504, which results in curing, sintering, or general stabilization. After that, in step 506, an electrode is applied on the network thus formed, whereupon, in step 508, an active layer is applied on the electrode. And finally, in step 510, an additional electrode is applied on the active layer.

Alternatively to the steps depicted in FIG. 5, it is also possible to start the method with the steps 500 and 506 through 510, wherein the electrode is obtained on an active layer on which the network is applied with the steps 502 and 504. FIG. 5 does not show how a protective layer is applied on the electrode with the network. This is necessary with the use of the electrochromic layer structure so produced in the form of an electrochromic glazing. In this case, the protective layer applied is, preferably, an additional oxide layer, a protective glass layer, a glass pane, and/or a plastic pane.

FIG. 6 depicts a schematic view of another embodiment of an electrochromic layer structure. The electrochromic layer structure comprises two electrochromatically active layers 100, wherein the layers are embedded between an external electrode 102 or 104 and an intermediate electrode 113. The external electrodes 102 and 104 are, in each case, covered on the side facing away from the active layer with transparent protective panes 106 and 108. For example, the electrochromic layer structure of FIG. 6 can be two electrochromic layer structures according to FIG. 1, wherein the transparent protective panes 106 and 108 are borosilicate glass.

The electrodes 102 and 104 as well as the intermediate electrode have electrically conductive networks 110. The effect of the electrically conductive networks 110 corresponds to the observations of the exemplary embodiment of FIG. 1.

In FIG. 6, an electrochromic control unit 112 is also depicted, which serve, through application of a voltage between the electrodes 102 and 113 as well as 104 and 113 as a transparency control of the active layers 100 relative to incident light. Via the external electrodes 102 and 104 and the intermediate electrode 113, two active layers 100 are independently switched. The electrodes 102 and 104 are anodes and the intermediate electrode 113 is a cathode. By application of a positive voltage to the anodes 104 and 102 and a negative voltage to the cathodes 113, for example, ion transport into the active layers 100, which include, for example, an ion-conductive polymer, occurs. Cathode 113 contains tungsten oxide, whereas the anodes 102 and 104 contain hydrogen ions. As a result of application of voltage between the anode and the cathode, hydrogen ions migrate through the ion-conductive polymer into the cathode 113 and form color centers there with tungsten oxide that absorb or reflect incident light. When, thereafter, a voltage of opposite polarity is applied, this effect is reversed such that decoloration of the cathode 113 occurs.

Another embodiment is depicted in FIG. 7. Here, an electrically conductive network 100 is located between the electrode 102 and a first protective layer 200. The protective layer 200 is an SiO2 layer. FIG. 7 depicts, above the first protective layer, a gaseous layer volume containing argon as a further protective layer 200, which is located between the first protective layer 200, the protective pane 106 made of soda lime glass, and spacers 210. The spacers 210 are designed in the shape of a frame and are gastight. The construction is modeled on a multipane insulating glazing. The active layer 100 contains an organic or inorganic solid electrolyte. The effect of the electrically conductive networks corresponds to the observations of the exemplary embodiment of FIG. 1.

An alternative embodiment thereto is depicted in FIG. 8. Here, an electrically conductive network 110 is located between the electrode 102 and a protective layer 200 containing SiO2. Moreover, FIG. 8 depicts a first protective pane 106 as an adhesive layer that is located between the protective layer 200 and an additional inner protective pane 106. The external protective panes 106 and 108 are borosilicate glass panes. The inner protective pane 106 is an adhesive film made of polyvinyl butyral (PVB). Such a PVB layer is typically melted at temperatures of ca. 150° C. onto the protective layer 200, such that, after cooling, there is a permanent bond between the protective layer 200 and the PVB layer 106, which protects the active layer 100, electrode 102, and/or the electrically conductive network 110 against external environmental influences. The active layer 100 contains an organic or an inorganic solid electrolyte.

An alternative embodiment of the layer structure according to the invention is depicted in FIG. 9. The layer structure includes electrically conductive networks 110 between the two electrodes 102 and 104 and the external protective panes 106 and 108. The external protective panes 106 and 108 are soda lime glass panes. The active layer 100 includes, preferably, an organic liquid electrolyte. The volume of the active layer is defined by frame-like spacers 210 between the external protective panes 106 and 108. The active layer 100 and the electrodes 102 and 104 with an electrically conductive network 110 are protected in the embodiment against environmental influences. The effect of the electrically conductive networks corresponds to the observations of the exemplary embodiment of FIG. 1.

Another alternative embodiment is depicted in FIG. 10. The layer structure includes electrically conductive networks 110 between the two electrodes 102 and 104 and the external protective panes 106 and 108. The external protective panes 106 and 108 are soda lime glass panes. The electrode layer 102 is coated, in particular, with an additional layer 101 of tungsten oxide. The active layer 100 includes an organic electrolyte that is designed partially liquid and partially solid. The active layer 100 and electrodes 102 and 104 with electrically conductive network 110 are protected against environmental influences in the embodiment. The effect of the electrically conductive networks corresponds to the observations of the exemplary embodiment of FIG. 1.

LIST OF REFERENCE CHARACTERS

100 Active layer
101 Layer with electrochromatic material
102 Electrode
104 Electrode
106 Transparent protective pane
108 Transparent protective pane
110 Network
112 Electrochromic control unit
113 Intermediate electrode
200 Transparent protective layer
202 Network
210 Spacer
300 Nanoparticles
302 Filling material
400 Prepare electrode
402 Apply network
404 Heat network
406 Apply active layer
408 Apply additional electrode
500 Prepare protective layer
502 Apply network
504 Heat network
506 Applied electrode
508 Apply active layer
510 Apply additional electrode

The invention claimed is:

1. An electrochromic layer structure comprising
at least one electrochromatically active layer;
at least two electrodes; and
an electrically conductive network of conductor tracks applied on at least one of the at least two electrodes, wherein the network of conductor tracks contains nanoparticles and forms a regular rectangular arrangement of conductor tracks wherein the conductor tracks have a width of less than 10 μm and wherein the conductor tracks have a distance of more than 1 mm between them.

2. The electrochromic layer structure according to claim 1, wherein the conductor tracks have a width of 1 μm to less than 10 μm and wherein the conductor tracks have a distance of more than 1 mm to 50 mm between them.

3. The electrochromic layer structure according to claim 1, further comprising
at least one optically transparent protective pane,
wherein the network of conductor tracks is located between the active layer and the optically transparent protective pane.

4. The electrochromic layer structure according to claim 3, wherein the optically transparent protective pane contains at least one of silicate glass, germanium, silicon, sapphire, polystyrene, polyamide, polyester, polyvinyl chloride, polycarbonate, ethylene vinyl acetate, plasticized polyvinyl butyral, polyimide, polyethylene terephthalate, polyethylene, polypropylene, polyurethane, ionomers, polymethyl methacrylate, copolymers and/or combinations thereof.

5. The electrochromic layer structure according to claim 1, further comprising
an optically transparent protective layer,
wherein the network of conductor tracks is located between the active layer and the optically transparent protective layer.

6. The electrochromic layer structure according to claim 5, wherein the optically transparent protective layer has at least one of a layer of silicon dioxide, silicon nitride, zinc oxide, tin oxide, indium oxide and/or a gaseous layer containing argon, xenon, nitrogen, air, and/or mixtures thereof.

7. The electrochromic layer structure according to claim 5, wherein the protective layer also has a gaseous layer volume containing argon, xenon, nitrogen, air, and/or mixtures thereof with a pressure of 1000 Pa to 200,000 Pa.

8. The electrochromic layer structure according to claim 1, further comprising
at least one intermediate electrode located between at least two active layers,
wherein the at least one intermediate electrode has an electrically conductive network of conductor tracks, the conductor tracks containing nanoparticles.

9. The electrochromic layer structure according to claim 1, wherein the nanoparticles contain silver particles and/or electrically conductive carbon.

10. The electrochromic layer structure according to claim 1, wherein the conductor tracks are formed by a composite material containing the nanoparticles and plastic.

11. The electrochromic layer structure according to claim 1, wherein the nanoparticles have a diameter of 1 nm to 500 nm, preferably of 5 nm to 100 nm.

12. An electrochromic device comprising the electrochromic layer structure according to claim 1, wherein the electrochromic layer structure is in electrical contact with a control unit.

13. The electrochromic device according to claim 12, wherein the layer structure is arranged on at least one transparent protective pane.

14. The electrochromic device according to claim 12, wherein the electrochromic device is a laminated glass pane.

15. The electrochromic device according to claim 12, wherein the electrochromic device is a double-insulating or multi-insulating glazing.

16. A method comprising:
using the electrochromic device according to claim 12 in a single, composite, double or multi-glazing of buildings or motor vehicles.

17. A method comprising:
using the electrochromic layer structure according to claim 1 in a single, composite, double or multi-glazing of buildings or motor vehicles.

18. The electrochromic device according to claim 1, wherein the electrochromatically active layer is designed to withstand temperatures above 70° C.

19. The electrochromic device according to claim 1, wherein the electrochromatically active layer is an electrochromic structure with an inorganic solid electrolyte.

20. The electrochromic device according to claim 1, wherein the electrochromatically active layer includes an organic electrolyte that is in part liquid and in part solid.

21. A method for production of an electrochromic layer structure comprising at least one electrochromatically active layer and two electrodes, comprising:
forming a network of nanoparticles in the layer structure, and
heating the network of nanoparticles to form an electrically conductive network of conductor tracks, wherein the electrically conductive network of conductor tracks is applied on at least one of the at least two electrodes to form a regular rectangular arrangement of conductor tracks wherein the conductor tracks have a width of less than 10 μm and wherein the conductor tracks have a distance of more than 1 mm between them.

22. The method according to claim 21, wherein the network of nanoparticles is formed by printing methods such as screen printing, engraving cylinder printing, inkjet printing, aerosol jet printing, flexography, pulse jet printing and/or combinations thereof.

23. The method according to claim 21, wherein the network of nanoparticles is formed using a dispersion that includes nanoparticles and water and/or an organic solvent and/or a liquid plastic.

24. The method according to claim 21, wherein the network of nanoparticles is heated by thermal conduction and thermal radiation such as infrared, ultraviolet, microwave radiation, laser light, and/or combinations thereof.

25. An electrochromic layer structure comprising
at least one electrochromatically active layer;
at least two electrodes; and
an electrically conductive network of conductor tracks applied on at least one of the at least two electrodes, wherein the network of conductor tracks contains nanoparticles and wherein the conductor tracks have different electrical conductivities wherein the conductor tracks have a width of less than 10 μand wherein the conductor tracks have a distance of more than 1 mm between them.

* * * * *